United States Patent [19]
Mattix et al.

[11] Patent Number: 5,983,583
[45] Date of Patent: Nov. 16, 1999

[54] JOINT CONSTRUCTION AND PANEL INSTALLATION SYSTEM

[76] Inventors: Jacob M. Mattix, New Orleans, La.; June B. Mattix, executrix, 415 North Solomon St., New Orleans, La. 70119

[21] Appl. No.: 08/715,438

[22] Filed: Sep. 18, 1996

[51] Int. Cl.⁶ ...................................................... E04B 1/38
[52] U.S. Cl. ...................... 52/282.5; 52/282.3; 52/282.4; 52/35; 403/293; 403/403
[58] Field of Search .......................... 52/270, 272, 282.1, 52/282.3, 282.4, 282.5, 264, 35, 582.1; 407/403, 293, 295

[56] References Cited

U.S. PATENT DOCUMENTS

| | | | |
|---|---|---|---|
| 1,165,413 | 12/1915 | Jester . | |
| 2,635,308 | 4/1953 | Crook | 52/272 X |
| 2,779,983 | 2/1957 | Sundelin et al. | 52/282.4 |
| 3,206,806 | 9/1965 | Powell | 52/282.3 X |
| 3,456,409 | 7/1969 | Piget | 52/282.1 |
| 3,528,559 | 9/1970 | Miller . | |
| 3,603,054 | 9/1971 | Didry | 52/282.1 |
| 3,688,459 | 9/1972 | Mattix . | |
| 3,789,568 | 2/1974 | Mattix . | |
| 3,811,241 | 5/1974 | Mattix . | |
| 3,989,397 | 11/1976 | Baker | 403/205 |
| 3,996,705 | 12/1976 | Gutierrez . | |
| 4,261,148 | 4/1981 | Scott | 403/403 X |
| 4,279,455 | 7/1981 | Santo | 312/330 R |
| 4,385,850 | 5/1983 | Bobath | 403/205 |
| 4,507,815 | 4/1985 | Danko | 403/403 X |
| 4,712,942 | 12/1987 | Brown | 403/403 X |
| 4,852,324 | 8/1989 | Page | 403/403 X |
| 4,865,066 | 9/1989 | Brooks . | |
| 5,079,880 | 1/1992 | Reid | 52/35 |
| 5,228,249 | 7/1993 | Campbell . | |
| 5,429,340 | 7/1995 | Young et al. | 52/272 X |

*Primary Examiner*—Beth Aubrey
*Attorney, Agent, or Firm*—C. Emmett Pugh; Pugh/Associates

[57] ABSTRACT

A concealed joint construction system for installing and securing sheet material such as laminated plastic wall boards, plywood and the like for finishing off bathtub and/or shower walls, counter-tops and back-splashes, and the like. The joint construction system includes an extending channel attached to one wallboard via multiple teeth sunk into matching grooves cut out of the wallboards edge. An adjacent wallboard can be easily and quickly inserted into the extending channel and is secured by pressure flanges perforated from the wall of the channel. The joint construction system is easily installed, secure, and compact, and is completely invisible after installation.

8 Claims, 2 Drawing Sheets

JOINT CONSTRUCTION AND PANEL INSTALLATION SYSTEM

The disclosure of the following United States patents is hereby incorporated by reference: Mattix (U.S. Pat. No. 3,688,459) issued Sep. 5, 1972; Mattix (U.S. Pat. No. 3,789,568) issued Feb. 5, 1974; and Mattix (U.S. Pat. No. 3,811,241) issued Dec. 14, 1976.

TECHNICAL FIELD

The present invention relates to joint construction technology for easily installing tub/shower wall paneling systems or counter-top/back-splash systems, and more particularly to an extended, side edge channel attached to a wall board or counter-top with perforated pressure flanges for securing a second wall board or back-splash when an edge thereof is received in the channel during the installation process.

BACKGROUND ART

A list of prior patents which may be of interest is provided below:

| U.S. Pat. No. | Inventor | Issue Date |
| --- | --- | --- |
| 1,165,413 | Jester | DEC 28 1915 |
| 3,528,559 | Miller | SEP 15 1970 |
| 3,688,459 | Mattix | SEP 05 1972 |
| 3,789,568 | Mattix | FEB 05 1974 |
| 3,811,241 | Mattix | MAY 21 1974 |
| 3,966,705 | Gutierrez | DEC 14 1976 |
| 4,865,066 | Brooks | SEP 12 1989 |
| 5,228,249 | Campbell | JUL 20 1993 |

The use of plastic laminated wallboards and the like for finishing of counter-tops and back-splashes and shower and bathtub installations in place of ceramic tiles has been common.

Various means of installing the wallboards and fixing them in place have been taught. However, until the joint construction and installation system of the Mattix patent (U.S. Pat. No. 3,688,459), all such prior art systems have various distinct disadvantages such as clumsiness, bulk, unattractiveness, visibility, a lack of security, expense, have leakage problems, are unduly time consuming, or require some degree of skill to obtain exact alignment. Nor have they been easily adaptable to both the counter-top/back-splash and shower/bathtub applications.

Examples of such prior art systems are the U.S. patents to Anglinetti, U.S. Pat. No. 3,420,021; Wilhoyte, U.S. Pat. No. 2,218,273; McBride, U.S. Pat. No. 3,277,617; Hobbs, U.S. Pat. No. 2,677,268; Sperry, U.S. Pat. No. 2,219,714; Gregoire, U.S. Pat. No. 3,376,679; and Schmitt, U.S. Pat. No. 1,672,914.

In the Mattix Pat. No. 3,688,459, although its disclosure provided quite a substantial advance in the art at its time, its approach also needed improvement. In particular, a rabbet or rectangular cut-out is required in the method of attaching the corner lock clip to a wallboard is rather unsophisticated and allows room for error in the exact alignment of the wallboards. In addition, in order to insert a second panel into the clip secured to a first panel, a rectangular cut-out must be made to prevent the clip from adding bulk to the corner. Nor are the lengths of the clip when installed precisely determined due to their angled orientation prior to the insertion of the second panel. This makes measuring the exact width of the panels and cut-out more difficult thereby making a tight and secure corner more difficult to achieve.

GENERAL SUMMARY DISCUSSION OF INVENTION

In contradistinction, the present invention provides a simple yet sophisticated means for attaching the joint construction system to a wall board leaving no room for error in the alignment of the two wallboards. The teeth on the joint construction system which mate with grooves on the edge of the wallboard require no alignment taking into consideration the length of the joint construction system nor do they in anyway extend off the back of the wallboard they are attaching to. No cut-outs are required in the wallboard to be inserted in the joint construction system nor are there any unfixed measurements at any time since there are no rotating members within the joint construction system. Therefor the present invention more simply, precisely and more securely achieves a corner joining of two wallboards.

It is thus an object of the invention to provide an easily assembled system of attaching and fixing together angularly intersecting wallboards, especially those intersecting at ninety (90°) degrees, particularly in such applications as wallboards for bathtub and shower installations, as well as counter-tops and back-splashes. The resulting installation is secure and does not require any alignment of the wallboards or counters. The joint provided by the installation is virtually leak-proof and attractive. The joint construction adds no bulk to the installation.

Other advantages, achievements and objects of the present invention will become apparent in considering the preferred embodiment described below.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
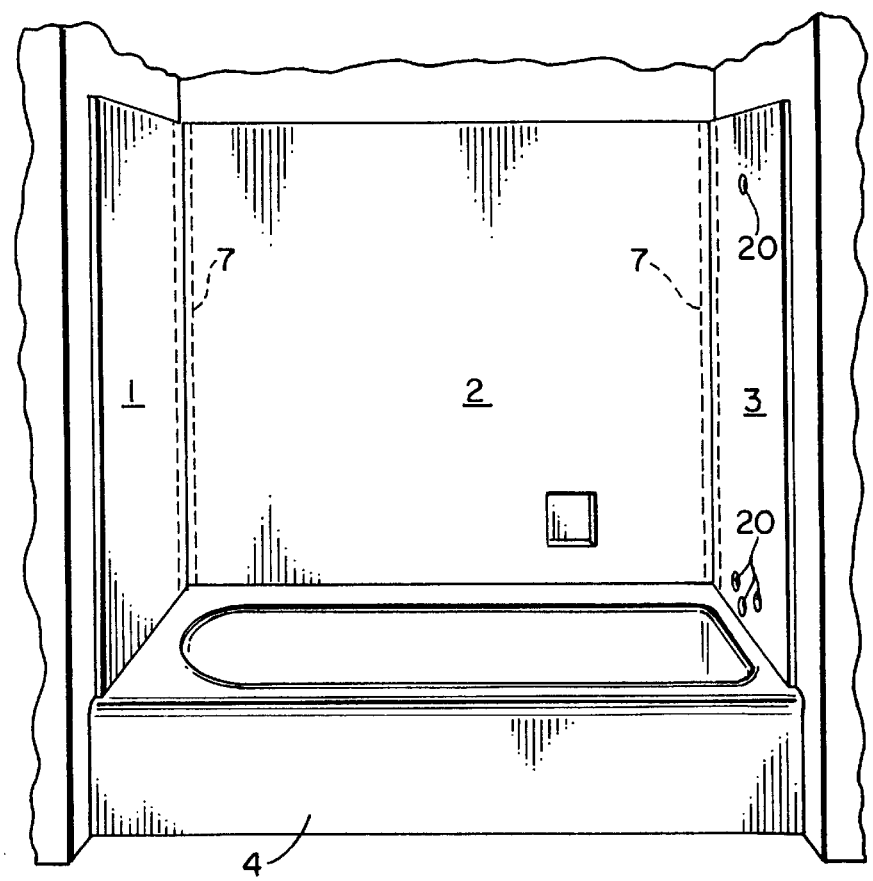
FIG. 1 is a perspective view of an exemplary bathtub/shower installation wherein the wallboards have been installed and fixed into place by means of the exemplary joint construction & installation system of the present invention.
Figure 2:
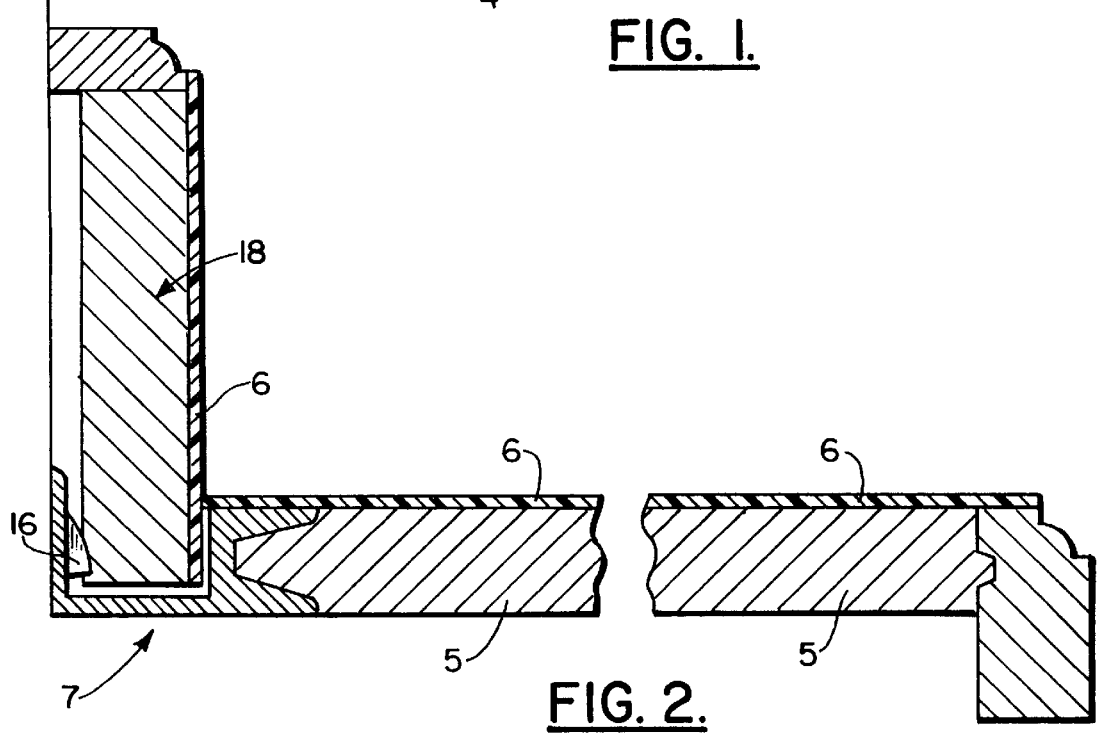
FIG. 2 is a cross-sectional view of a second application showing the mating of the counter-tops after installation as one counter-top panel has been installed next to the back-splash panel.

As shown in FIGS. 1 & 2, respectively, the exemplary, preferred joint construction & installation system of the present invention has two particular, exemplary applications—the providing of suitable wallboard or panel installation for bathtub and shower base enclosures and the like, as well as counter-top and back-splash installations, and the like.

As is standard in bathtub and shower base enclosures, there is provided three sheets 1, 2 and 3 of wallboard enclosing three sides of a bathtub installation 4. The three panels or sheets 1, 2 and 3 that comprise the outer walls above the tub 4 can be, for example, made up of five-eighths exterior plywood to which either fifty thousands (0.050") of an inch or one thirty-seconds (1/32") of an inch laminated plastic is adhered by contact cement, a composite wallboard which has been found quite satisfactory in this application.

However, of course, the present invention can be applied to many different kinds of substantial sheet or panel materials. In addition, the two panels that comprise the counter-top and back-splash (see FIG. 2) similarly include a substrate material 5 and a laminate material 6. The substrate 5 may be particle board, plywood, foam or other suitable material.

One of each pair of panels, for example panel 5, has along one side edge a joint construction system 7 attached at one side edge 8 of the panel by means of two teeth 9 which extend from an attachment edge 14 into corresponding grooves 10 along the side edge of the panel, or by other fastening means.

Figure 3:
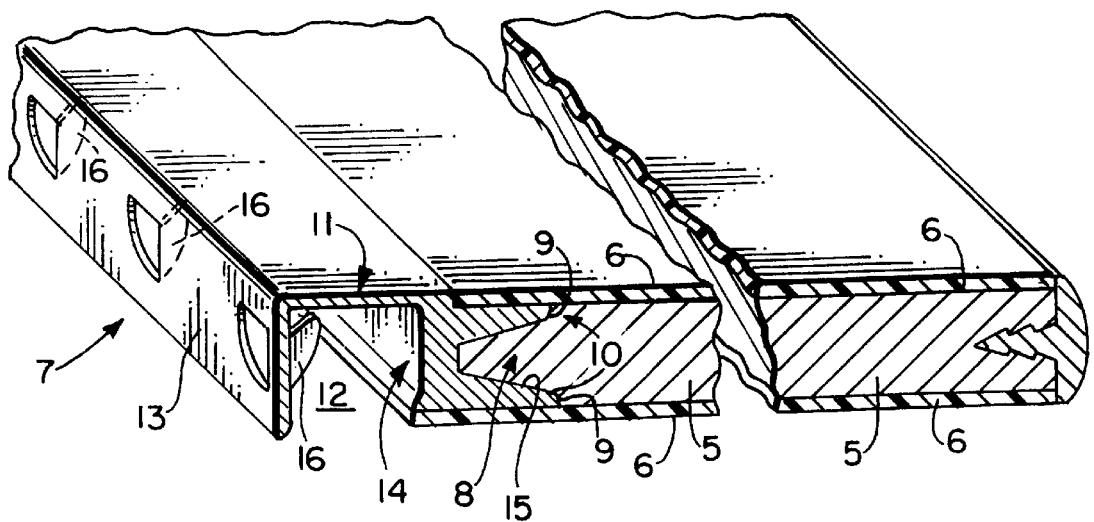
FIG. 3 is an isometric view of the exemplary joint construction & installation system installed on one wallboard panel or counter-top.
Figure 4:
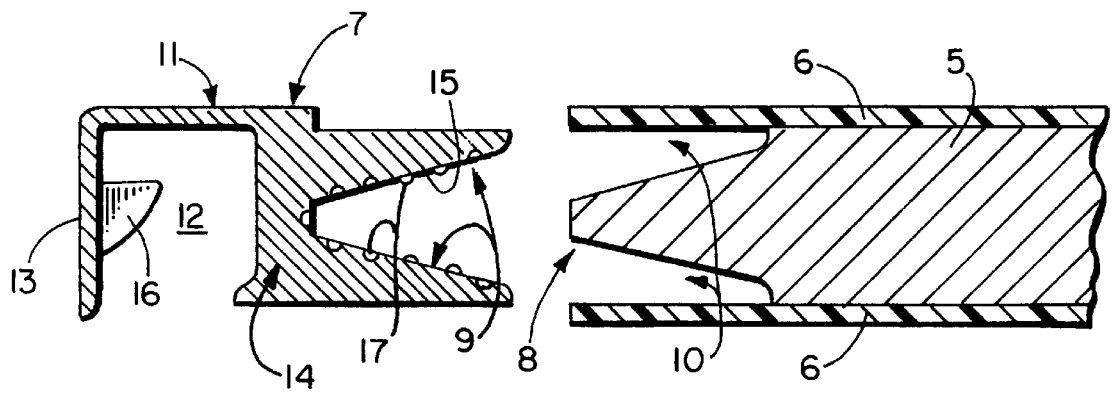
FIG. 4 is a cross-sectional view of the exemplary joint construction & installation system prior to attachment with a first panel.

The joint construction first extends out by means of a channel base 11 in a direction generally perpendicular to attachment edge 14 of the joint construction for a certain distance dependent upon the thickness of the edge of the panel which is to be placed in the joint construction 7. As can be seen in FIGS. 3 & 4, the joint construction forms a channel 12 with the attachment edge 14 of the joint construction, the channel base 11, and a channel wall 13 extending perpendicular to the channel base 11.

Out of the channel wall 13 protrude a series of pressure flanges 16 which are perforated out of the channel wall 13 itself. The pressure flanges extend downwardly into the channel thereby allowing for insertion of the second panel 18 into channel 12 and then upon insertion, pressuring the panel so as to secure it in position within the joint construction and against the first panel 5.

The joint construction 7 can extend down along the entire side edge of the panel, as a single, integral clip as indicated by the phantom lines 7" in FIG. 1, or there can be provided a series of similar joint constructions down along the edge. The joint construction can be made of, for example, metal or plastic, although other materials possessing the requisite amount of strength, durability and resiliency are also possible.

The attachment member 14 preferably has a slight bevel. Also, the two teeth 9 contain irregularities, either dimples or projections 17, to provide a conducive surface for adhesive material 15 between the teeth 9 and the substrate grooves 10.

The teeth 9 on the joint construction 7 and the grooves 10 on the panel members are provided during manufacture or in the shop where they can be done on a production basis. There is thus no make-up work necessary on site, leaving only a simple installation job.

As best seen in FIGS. 3 & 4, The system includes the following easy and straightforward steps for installation of the tub or shower enclosure, or for a counter-top and back-splash installation.

For an installation that requires three panels to be installed, any one of the panels may be installed first. For instance, panel 3 may be installed first, aligning faucet and shower holes 20 with a joint construction 7" installed on its edge. Panel 2 would subsequently be installed into the joint construction on panel 3, and would have a comparable joint construction on its opposite edge. Panel 1 would finally be installed into the joint construction on panel 2.

Or, panel 2 could be installed first with a joint construction on each end. Subsequently panels 1 and 3 would be installed to the joint constructions. Either way each panel will be exactly aligned since the joint construction is a rigid member of an exact dimension and the installment of one panel with a joint construction does not depend upon the exact placement of a second panel. The exact width of the second panel is already accounted for in the size of the channel on the joint construction.

For a two panel installation, more likely a counter-top 5 and back-splash 18 installation, preferably the counter-top is installed with a joint construction 7 affixed to the edge abutting the adjacent wall. The back-splash 18 is then fixed into place perpendicularly to the counter-top. To finish off any installation, sealant material is provided along all the exposed edges of the paneling.

The builder is thus provided with a system which is economical, easier to install, requires less tedious measuring and aligning, and is more secure and compact. The homeowner is provided with a water proof corner connection that will maintain a tight fit and is virtually care free.

It is noted that the embodiments described herein in detail for exemplary purposes is of course subject to many different variations in structure, design, application and methodology. Because many varying and different embodiments may be made within the scope of the inventive concept(s) herein taught, and because many modifications may be made in the embodiments herein detailed in accordance with the descriptive requirements of the law, it is to be understood that the details herein are to be interpreted as illustrative and not in a limiting sense.

| REFERENCE NUMBERS |
| --- |
| 1 panel sheet |
| 2   " |
| 3   " |
| 4 tub |
| 5 substrate |
| 6 laminate |
| 7 joint construction |
| 8 side edge of panel where joint construction attached |
| 9 two teeth attaching joint construction |
| 10 grooves into which teeth fit |
| 11 channel base |
| 12 channel |
| 13 channel wall |
| 14 attachment edge |
| 15 adhesive material |
| 16 pressure flange |
| 17 dimples/projections |
| 18 |
| 19 |
| 20 faucet and shower holes |

What is claimed is:

1. A joint construction and installation system for installing at least two, adjacent, construction panels of sheet material with top planar surfaces which angularly intersect at their side edges on a basic support structure when installed thereon, comprising:

a first panel (1) of sheet material having first and second, opposed, side edges and at least one joint construction (7) having an attachment edge installed along one (8) of said side edges of said first panel, said one of said side edges having at least two grooves; said joint construction having a channel base (11) extending out from said attachment edge in a direction generally perpendicular to attachment edge; said joint construction also having a channel wall (13) extending perpendicularly from said channel base, said channel wall with said channel base and said attachment edge defining a channel (12); said channel wall containing pressure means which apply a resilient pressure force inwardly into said channel;

a second panel (2) of sheet material having first and second, opposed, side edges for installation next to and at an angular disposition to said first panel; said second panel being easily insertable at one of said side edges of said second panel into said channel against the resilient force of the pressure means, said second panel being held in place at said one of said side edges of said second panel by said joint construction by means of said pressure means holding the inserted second panel against said one of said side edges of said first panel; and multiple teeth on said attachment edge received into said grooves along said one of said side edges of said first panel.

2. The system of claim 1, wherein said multiple teeth on said attachment edge of said joint construction contain:

a plurality of irregularities on their surface providing a rough surface for securely placing adhesive between the teeth and the grooves.

3. A joint construction and installation system for installing at least two, adjacent, construction panels of sheet material with top planar surfaces which angularly intersect at their side edges on a basic support structure when installed thereon, comprising:

a first panel (1) of sheet material having first and second, opposed, side edges and at least one joint construction (7) having an attachment edge installed along one (8) of said side edges of said first panel; said joint construction having a channel base (11) extending out from said attachment edge in a direction generally perpendicular to said attachment edge; said joint construction also having a channel wall (13) extending perpendicularly from said channel base, said channel wall with said channel base and said attachment edge defining a channel (12); said channel wall containing pressure means which apply a resilient pressure force inwardly into said channel;

a second panel (2) of sheet material having first and second, opposed, side edges for installation next to and at an angular disposition to said first panel; said second panel being easily insertable at one of said side edges of said second panel into said channel against the resilient force of the pressure means, said second panel being held in place at said one of said side edges of said second panel by said joint construction by means of said pressure means holding the inserted second panel against said one of said side edges of said first panel; and a series of pressure flanges forming said pressure means perforated from the length of said channel wall and extending into said channel.

4. The system of claim 3, wherein the joint construction and installation system further includes:

a third panel of sheet material having two, opposed, side edges for installation next to and at an angular disposition to a selected one of said first and said second panels; and a second joint construction substantively identical to said first joint construction attached along a selected one of said side edges of one of said panels.

5. The system of claim 4, wherein said first panel is installed centrally to said second and third panels and has installed at said first side edge of said first panel said first joint construction and has at said second side edge of said first panel said second joint construction each adapted to receive said third panel and said second panel, respectively.

6. The system of claim 3, wherein said first panel is a counter-top and said second panel is a back-splash.

7. A joint construction and installation system for installing at least two, adjacent, construction panels of sheet material with top planar surfaces which angularly intersect at their side edges on a basic support structure when installed thereon, comprising:

a first panel (1) of sheet material having first and second, opposed, side edges and at least one joint construction (7) having an attachment edge installed along one (8) of said side edges of said first panel; said joint construction having a channel base (11) extending out from said attachment edge in a direction generally perpendicular to said attachment edge; said joint: construction also having a channel wall (13) extending perpendicularly from said channel base, said channel wall with said channel base and said attachment edge defining a channel (12); said channel wall containing pressure means which apply a resilient pressure force inwardly into said channel;

a second panel (2) of sheet material having first and second, opposed, side edges for installation next to and at an angular disposition to said first panel; said second panel being easily insertable at one of said side edges of said second panel into said channel against the resilient force of the pressure means, said second panel being held in place at said one of said side edges of said second panel by said joint construction by means of said pressure means holding the inserted second panel against said one of said side edges of said first panel;

said one of said side edges of said first panel and said attachment edge being matingly beveled to fit together.

8. A joint construction and installation system for installing at least two, adjacent, construction panels of sheet material with top planar surfaces which angularly intersect at their side edges on a basic support structure when installed thereon, comprising:

a first panel (1) of sheet material having a top planar surface and having first and second, opposed, side edges and at least one joint construction (7) having an attachment edge installed along one (8) of said side edges; said joint construction having a channel base (11) extending out from said attachment edge in a direction generally perpendicular to said attachment edge; said joint construction also having a channel wall (13) extending perpendicularly from said channel base, said channel wall with said channel base and said attachment edge defining a channel (12); said channel wall containing pressure means which applies a resilient pressure force inwardly into said channel;

a second panel (2) of sheet material having first and second, opposed, side edges for installation next to and at an angular disposition to said first panel; said second panel being easily insertable at one of said side edges of said second panel into said channel against the resilient force of the pressure means, said second panel being held in place at said one of said side edges of said second panel by said joint construction by means of said pressure means holding said second panel against said one of said side edges of said first panel; said joint construction, in being installed on said first panel, making contact with said first panel only on one of said side edges of said first panel, said joint construction being completely concealed when viewed from said top planar surface of said first panel after said second panel is fully installed with said first panel.

* * * * *